(12) United States Patent
Orias et al.

(10) Patent No.: US 9,446,864 B2
(45) Date of Patent: Sep. 20, 2016

(54) NANOSAT ELECTROTHERMAL DEPLOYMENT SYSTEM

(71) Applicant: The Boeing Company, Chicago, IL (US)

(72) Inventors: Geoffrey Orias, Laguna Beach, CA (US); Michael Worcester, Orange, CA (US); John Behrens, Torrance, CA (US); Bruce L. Drolen, Altadena, CA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 14/517,532

(22) Filed: Oct. 17, 2014

(65) Prior Publication Data

US 2016/0107771 A1 Apr. 21, 2016

(51) Int. Cl.
*B64G 1/00* (2006.01)
*B64G 1/64* (2006.01)
*B64G 1/22* (2006.01)
*H05B 3/00* (2006.01)
*H05B 3/06* (2006.01)

(52) U.S. Cl.
CPC ............. *B64G 1/645* (2013.01); *B64G 1/222* (2013.01); *H05B 3/0014* (2013.01); *H05B 3/06* (2013.01)

(58) Field of Classification Search
CPC ......... B64G 1/64; B64G 1/222; B64G 1/645
USPC ...................................................... 244/173.3
See application file for complete search history.

(56) References Cited

U.S. PATENT DOCUMENTS

| 8,033,684 | B2 | 10/2011 | Marshall et al. |
| 8,745,864 | B2 | 6/2014 | Kessler et al. |
| 8,766,511 | B2 | 7/2014 | Duce et al. |
| 2006/0088366 | A1* | 4/2006 | Retat .................. B64G 1/645 403/28 |
| 2012/0197482 | A1 | 8/2012 | Moser et al. |
| 2013/0079955 | A1 | 3/2013 | Masiello et al. |
| 2015/0102172 | A1* | 4/2015 | Thurn .................. B64G 1/40 244/158.2 |

* cited by examiner

*Primary Examiner* — Christopher P Ellis
*Assistant Examiner* — Richard G Davis
(74) *Attorney, Agent, or Firm* — Miller, Matthias & Hull LLP

(57) ABSTRACT

An electrothermal deployment system may be configured for controlled release of various apparatus from their prelaunch stowage positions in small satellites. The deployment system includes a fusible line secured to a structural component of the satellite, as well as to various deployable apparatus secured to, within, or on the satellite. The deployable apparatus may include items such as solar panels and antennas. The deployment system includes an electrically resistive element such as a burn bar formed of a cylinder or tube, including a resistor pad overlying and/or incorporated within an exterior surface of the burn bar. The burn bar may be coupled to an electrical circuit configured to heat the resistor for the purpose of melting the fusible line secured in direct contact therewith, thus causing the fusible line to break to cause deployment. The fusible line is configured to remain in secure contact with the resistor until apparatus deployment.

20 Claims, 5 Drawing Sheets

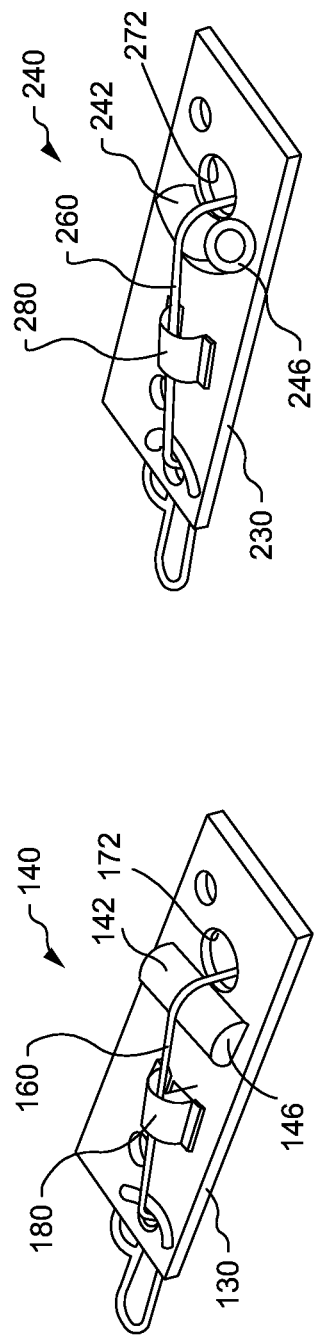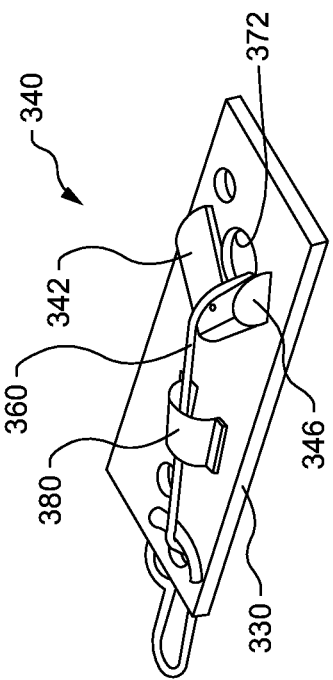
FIG.5A  FIG.5B  FIG.5C

NANOSAT ELECTROTHERMAL DEPLOYMENT SYSTEM

FIELD

The present disclosure relates generally to deployment of equipment stowed in or on a very small satellite, and more specifically to devices configured for electrothermal deployment of apparatus such as solar panels and antennas from their launch-secured stowage positions aboard such satellites.

BACKGROUND

Very small satellites having a wet mass of between 1 and 10 kg. (2 to 22 lbs.) have been commonly termed "nanosats". Satellites of this category, which may be as small or smaller than a loaf of bread, are relatively inexpensive to build, but are typically very delicate structures. They may be configured to carry onboard computers adapted to interface with communication systems designed to not only control directional stability including orbit commands, but also to permit deployments of onboard apparatus, such as solar panels and antennae, from their prelaunch stowed positions to their operational positions on an orbiting satellite.

Weight management is critical with respect to design and operation of a nanosat. As such, normal earth-bound structures such as spring-loaded latches and motorized structures to operate such devices, even when miniaturized, may be too massive for consideration for use in a nanosat. Instead, alternatively designed structures are often developed to manage nanosat functions.

For example, the simple operation of remotely uncoupling a solar panel or an array of antennae may require use of electrically controlled structures involving extremely lightweight elements. Achievement of sufficient combinations of strength and lightness can be challenging, particularly when pre-testing protocols may be required to qualify various parts for dependable operability. Indeed, the latter protocols may require that some parts critical to the deployment function may be subjected to several prelaunch cycles to demonstrate satisfactory repeatability, i.e. more than single use functioning without failure, in order to qualify for launch readiness.

One known deployment system used in prior nanosat structures has involved use of thin coiled nichrome wiring configured for melting a nylon fishing line adapted to release or deploy apparatus such as solar panels and antennae. Issues with the coils, including their overheating, fusing, and/or breaking prior to sufficiently heating the nylon to its melting point, as well as lack of system repeatability, have created a need for more reliable deployment structures.

It is therefore desirable to provide improved deployment systems for nanosats.

SUMMARY

In accordance with one aspect of the present disclosure, an electrothermal system is configured for controlled release of deployable apparatus relative to small satellites. The deployment system includes an electrical power source and a thermal energy release device in communication with the power source.

In accordance with another aspect of the present disclosure, a resistive element is configured to generate heat via the electrical power source to melt a fusible line, configured in one form as a monofilament, affixed to a structural component of the satellite to release at least one deployable apparatus secured to the satellite.

In accordance with another aspect of the present disclosure, the fusible line is configured for direct contact with the energy release device, and is melted by heat produced by the energy release device for deployment of the apparatus.

In accordance with another aspect of the present disclosure, a burn bar is adapted to melt a fusible line to cause deployment of an apparatus secured to a small satellite. The burn bar includes a substrate body secured to the satellite, and has an insulative material deposited on an outer surface of the substrate, and a layer of electroconductive material deposited over portions of the insulative material.

In accordance with another aspect of the present disclosure, a fusible line is secured against the electroconductive material, and the electroconductive material is heated, causing the fusible line to reach its melting point to cause release of apparatus secured to the fusible line.

In accordance with another aspect of the present disclosure, a method of deploying an apparatus secured by a fusible line to a nanosat includes steps of providing a metal substrate, securing the substrate to the nanosat, depositing an insulative material on a peripheral surface of the substrate, and depositing a layer of electroconductive material over portions of the insulative material.

In accordance with another aspect of the present disclosure, the method further includes providing an electrical source within the nanosat, and connecting the electroconductive material to the electrical source, stringing a fusible line over the electroconductive material, and securing the fusible line to the nanosat, and attaching the fusible line to the apparatus to be released.

In accordance with another aspect of the present disclosure, the method further includes stringing the fusible line against the electroconductive material under tension, providing an electrical current from the electrical source through the electroconductive material, the electrical current being sufficient to heat the fusible line to its melting point to release the apparatus.

In accordance with yet another aspect of the present disclosure, the method further includes laser etching the electroconductive material to form a resistor, and providing an electric current from the electric source through the resistor sufficient to heat the fusible line to its melting point.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 5A is a perspective view of a second embodiment of the electrothermal deployment system of the present disclosure.

FIG. 5B is a perspective view of a third embodiment of the electrothermal deployment system of the present disclosure.

FIG. 5C is a perspective view of a fourth embodiment of the electrothermal deployment system of the present disclosure.

Figure 1:
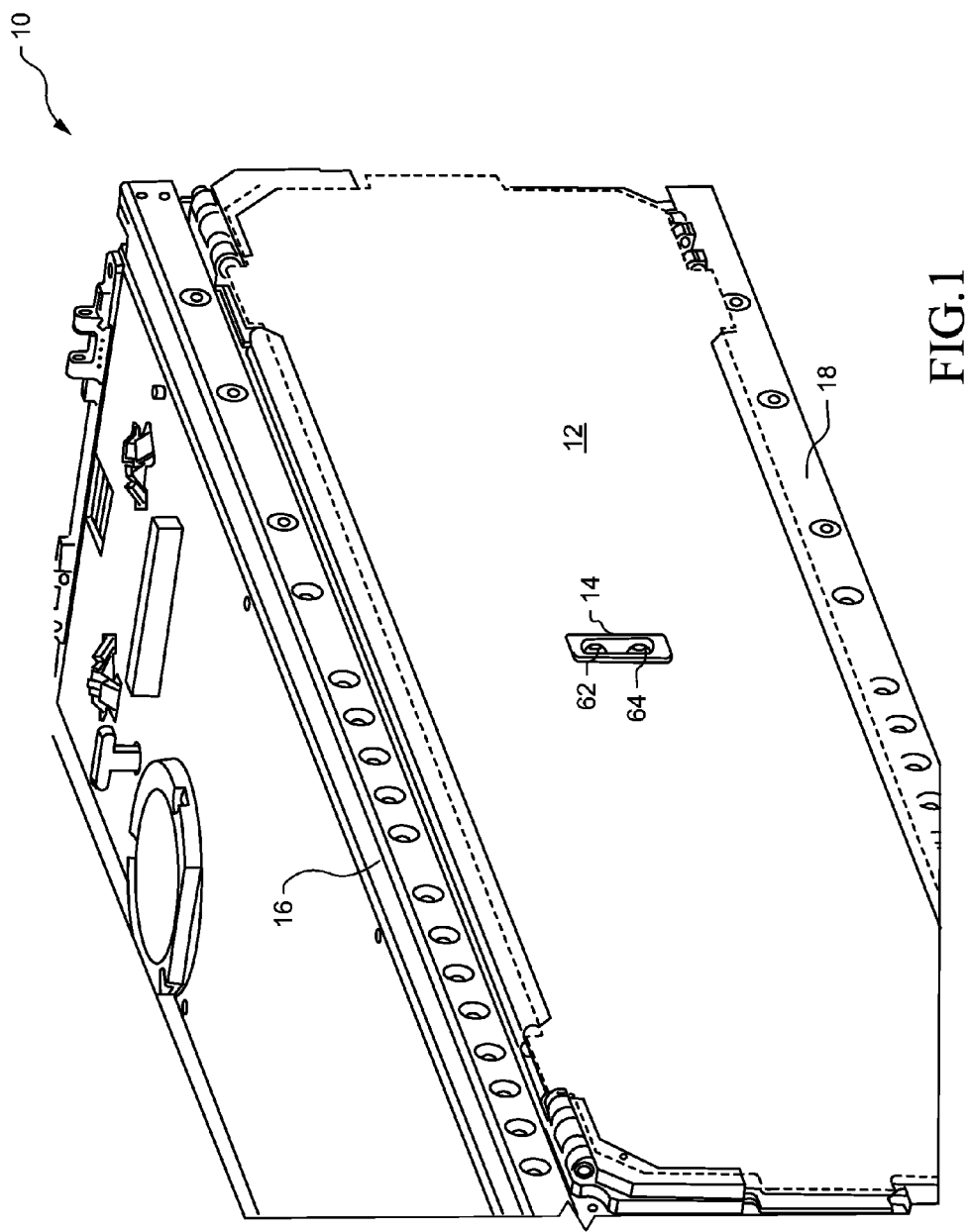
FIG. 1 is a fragmentary perspective view of a small satellite that incorporates the electrothermal deployment system of the present disclosure.

It should be understood that the drawings are not to scale, and that the disclosed embodiments are illustrated only schematically. It should be further appreciated that the following detailed description is only exemplary, and not intended to be limiting. As such, although the present disclosure is, for purposes of explanatory convenience, depicted and described in only illustrative embodiments, the disclosure may be implemented in numerous additional embodiments, and within various additional systems and environments not shown or described herein.

DETAILED DESCRIPTION

The following detailed description is intended to provide both apparatus and methods for carrying out the disclosure. Actual scope of the disclosure is as defined by the appended claims.

With respect to references to elements depicted in the drawings, as each new embodiment is introduced the elements that are similar to those in previously introduced embodiments will share similarly numbered relationships, though separated by a multiple of one hundred, unless otherwise indicated. For example, the resistive element, i.e. the burn bar 42, of the deployment device 40 is depicted in FIG. 1 as element 42, in FIG. 5A as element 142, and in FIG. 5B as element 242, etc.

FIG. 1 illustrates a very small commercial satellite, called a "nanosat" 10, which incorporates a deployable panel 12. The panel 12 incorporates a panel release mechanism 14 to which may be secured a fusible line as described below. The nanosat 10 incorporates structural frame, including elements 16, 18, adapted to support all contents of the nanosat, including communications equipment, stabilizer elements, antennas, and the like.

Figure 2:
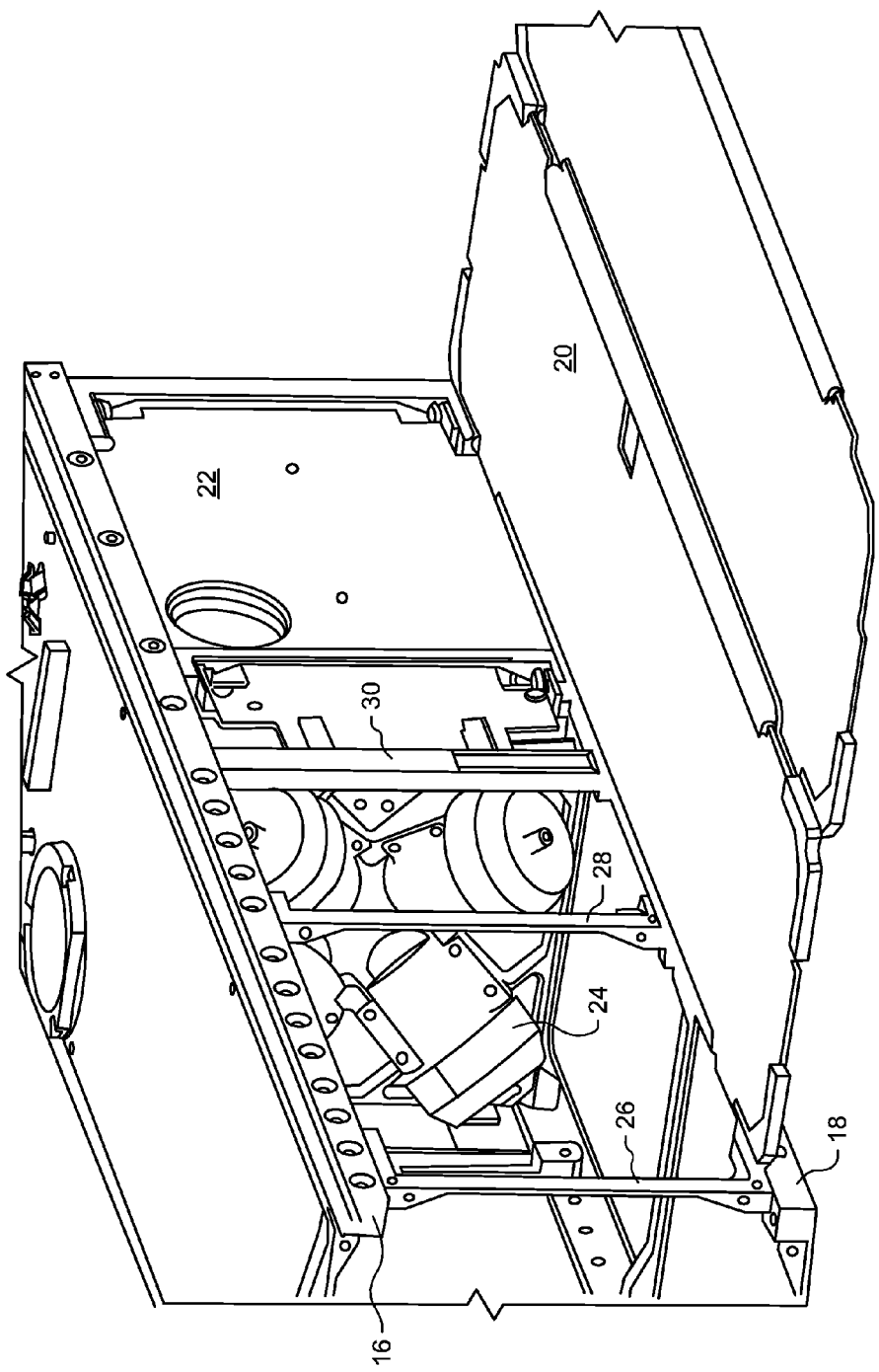
FIG. 2 is a perspective view of the satellite of FIG. 1, but with a solar panel shown in a deployed position.

Referring now to FIG. 2, a solar panel 20, constituting an opposite side of the deployable panel 12 of FIG. 1, is shown as deployed from its prelaunch or stowed position (of FIG. 1). In the deployed position, it will be appreciated that the solar panel 20 has been released by virtue of the panel release mechanism 14, as further described below. It will also be appreciated that the solar panel 20 may be hinged to the structural frame element 18, and stowed against a non-deployable interior panel 22 for, inter alia, assuring a compact envelope for pre-stowage of the nanosat 10 within a deployable launch module (not shown). Such launch module would normally be carried aboard an earth-to-orbit rocket (not shown). Although this embodiment may depict the solar panel 20 as the only panel containing solar cells (not shown), this disclosure is not to be construed as being so limited. For example, the exterior deployable panel 12 of FIG. 1 may contain solar cells as well.

Contained within the body of the nanosat 10 are various satellite components, including stabilizer elements 24, as shown. The structural frame elements 16, 18 are secured rigidly together via structural support beams 26, 28, 30. In the described embodiment, the support beam 30 (exterior face shown, only) may be configured to contain a deployment device of the present disclosure.

Figure 3:
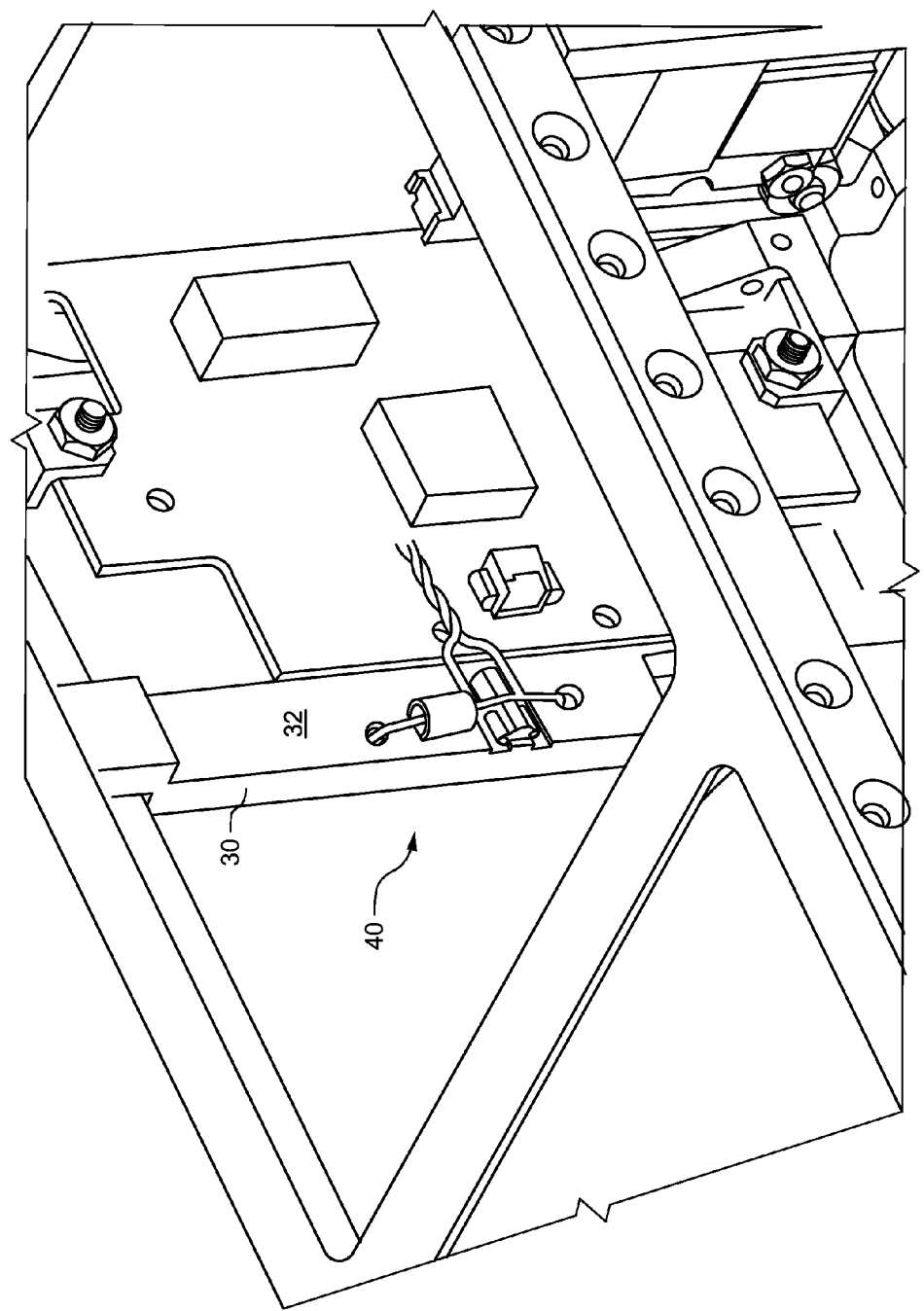
FIG. 3 is a front elevational perspective view of an interior portion of the satellite of FIGS. 1 and 2.
Figure 4:
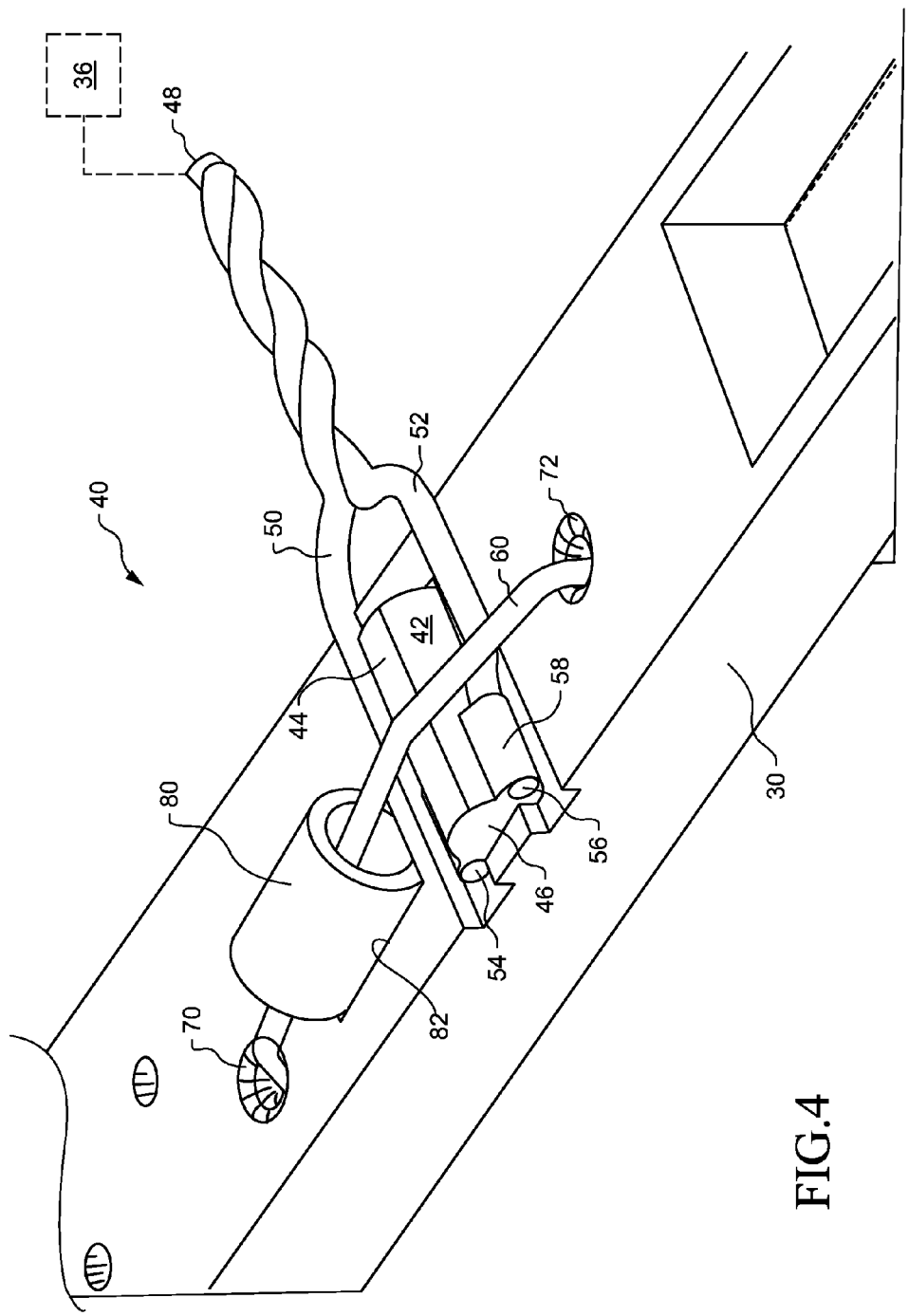
FIG. 4 is an enlarged perspective view of a portion of the view of FIG. 3.

Thus, referring to FIG. 3, an interior face 32 of the support beam 30 contains a deployment device 40, as shown. Referring also to FIG. 4, the deployment device 40 contains an electrically resistive element 42, herein also called a burn bar 42, depicted as a solid cylinder, but which may also be tubular, or have a variety of other shapes, some of which are shown and described below as alternative embodiments. On an exterior surface of the burn bar 42, an electric resistor pad 44 may be etched from an applied electroconductive material coated over the exterior surface of the burn bar 42.

The burn bar 42 may be attached to the support beam 30 via epoxy to avoid weight of conventional weld materials. In the described disclosure, the solid cylinder or tubular burn bar 42 can provide a more robust heat sink than a simple resistive flat-styled burn bar (not shown). As such, it will be apparent to those skilled in the art that heat released from the resistor pad 44 may be better isolated via the cylindrical or tubular burn bar substrate from transfer into the physical nanosat structure, i.e., the support beam 30. As such, the described configuration may require less electric power for deployment, while minimizing undesirable heat transfers to adjacent structures.

An electrical wiring harness 48 is secured to the burn bar 42 as shown. A positive electrical lead 50 and a negative electrical lead 52 have their respective ends 54, 56 secured to opposed sides of the burn bar 42, more specifically to lead connection structures 58. A fusible line 60 is secured tightly across the burn bar 42, and specifically at a position to make direct contact with the resistor pad 44. The fusible line 60 as shown and described herein is a single strand or monofilament. Such fusible line 60 may alternatively consist of a multi-strand line in appropriate scenarios, e.g. one requiring higher load-bearing, for example. An electrical source 36 (shown schematically in FIG. 4) is contained within the nanosat 10, and may be configured to apply sufficient voltage to the resistor pad 44 to physically heat the resistor pad to melt the fusible line 60 for achieving desired deployment, from prelaunch stowage position, of onboard satellite apparatus such as the solar panel 20.

In the disclosed embodiment, the burn bar 42 may be configured for a lower voltage requirement than known prior art configurations. As such, it can be made robust enough to be reusable, as may be required under various test repeatability protocols, particularly to assure that a given burn bar will melt the fusible line 60 in a predetermined amount of time. The burn bar 42 may be configured as a printed heater embodiment, or may alternatively be configured as a simple non-printed resistor.

The fusible line 60 may be secured to the deployable solar panel 20 in a manner to assure direct contact between the line 60 and the resistor pad 44 for reliable deployment. For this purpose, those skilled in the art will appreciate that the line 60 may be strung under a tensile load through spaced apertures 70, 72 (FIG. 4) of the frame support beam 30, for connection of respective ends 62, 64 of the line 60 to the above-described panel release mechanism 14 (see FIG. 1). The apertures 70, 72 may be chamfered to avoid chafing or damage to the fusible line 60.

For convenience, particularly prior to launch of the nanosat 10, a line guide 80, depicted herein as a tube, may be utilized for control of one or both free ends 60, 64 of the fusible line 60 prior to securement thereof to the panel release mechanism 14. In order to secure the guide 80, a recess or channel 82, sized and shaped to at least partially countersink the guide 80, may be formed in the support beam 30, as shown. Alternately, the guide 80 may be secured to the support beam 30 by an adhesive or bonding agent, such as an epoxy (not shown).

Example

By way of illustration only, the fusible line 60 may be formed of a fusible material of approximately 3.0 thousandth of an inch diameter, capable of bearing approximately at least 5, and up to 40, tensile pounds of force, as a nylon fishing line, for example. The resistive element or burn bar 42 may be of a solid or tubular structure, and the resistor pad 44 may be formed on an exposed exterior surface of the burn bar. The burn bar may be configured such that the burn bar 42 may be subjected to approximately 5-12 volts for less than 15 seconds, for example 3-8 seconds, to satisfactorily heat and melt the fusible line, which will typically heat up faster in a space or vacuum environment, as compared to an atmospheric environment. For both weight control and performance, the substrate body 46 of the burn bar 42 may be formed of an aluminum alloy. The burn bar 42 may be formed as part of a printed circuit board, and may be approximately 80 thousandths of an inch diameter, and configured to satisfactorily handle 12 volts without failure for achieving reliable and satisfactory electrothermal deployment. The positive and negative lead lines 50, 52 may each be of 30 gauge thickness, and may be formed of copper metal.

The resistor pad 44 may be designed as a 40 ohm resistor, with approximately 0.3-0.5 amperes of current sufficient to melt the fusible line 60. The resistor pad 44 may be approximately sized at 0.092 inch length by 0.25 inch. The fusible line may be tensioned within a range of 4 to 15 pounds in the described embodiment, for example 11 pounds. Under noted voltage and current targets, the resistor pad 44 will reach at least 250° C. in ambient air, and a presumably higher temperature in a vacuum or space environment.

Method

A method of making an electrothermal deployment system for deploying an apparatus secured by a fusible line to a nanosat may include the steps of providing a resistive element to form a substrate, securing the resistive element to the nanosat, and depositing an insulative material on a peripheral surface of the resistive element. The method may further include depositing a layer of electroconductive material over portions of the insulative material, providing an electrical source within the nanosat, and connecting the electroconductive material to the electrical source.

The method may further include stringing a fusible line over the electroconductive material, and securing the fusible line to the nanosat, then attaching the fusible line under tension to the apparatus to be released, and providing an electrical current from the electrical source through the fusible line sufficient to heat the fusible line to melting point for release of the deployable apparatus.

The method may further include laser etching the electroconductive material to form a resistor, and providing an electric current from the electric source through the resistor sufficient to heat the fusible line to its melting point.

Alternative Embodiments

FIGS. 5A, 5B, and 5C display second, third, and fourth alternate embodiments of the electrothermal deployment system of the present disclosure.

For example, FIG. 5A displays a second embodiment of a deployment device 140, which includes a resistive element 142 formed of a straight solid cylindrical substrate body 146, as depicted. However, the fusible line 160 of the deployment device 140 passes through a U-clamp line guide 180.

In FIG. 5B, a third embodiment of a deployment device 240 depicts a tubular shaped resistive element 242 that has a C-shaped curved substrate body 246. The fusible line 260 passes through a U-clamp line guide 280.

Finally, FIG. 5C depicts yet a fourth embodiment of a deployment device 340, that includes a resistive element 342 having a solid Chevron-shaped substrate body 346. The fusible line 360 passes through a U-clamp line guide 380.

The various substrate bodies 46, 146, 246 and 346 may be formed of lightweight metal, for example, an aluminum alloy. Dielectric as well as conductive coatings may be selectively applied over the alloy substrate bodies, and various portions of the coatings may then be laser etched, or otherwise selectively removed in predetermined places for desired results, consistent with printed circuit board practices.

Although several embodiments have been disclosed herein, it should be appreciated that the depictions shown and detailed with respect to various aspects and features are not intended to be limiting, but are for economy and convenience of description, only. For example, although the fusible line 60, 160, 260, 360 shown and described herein is a single strand line, i.e. the described monofilament, such fusible line may also be multi-stranded; i.e. having two, three, or more strands (not shown). Such strands could be braided or otherwise cross-linked in some fashion.

What is claimed is:

1. A deployment system configured for controlled release of apparatus relative to small satellites, comprising:
   an electrical power source;
   a reusable energy release device in communication with the power source, the energy release device including an insulative material, and including a resistive element overlying the insulative material for generating heat via the electrical power source;
   a fusible line affixed to a structural component of the satellite, the fusible line also affixed to at least one deployable apparatus secured to the satellite;
   wherein the fusible line is configured for contact with the energy release device, and can be melted by the heat of the resistive element, for deployment of the apparatus.

2. The deployment system of claim 1, wherein the energy release device is a burn bar, and wherein the resistive element is a resistor pad.

3. The deployment system of claim 2, wherein the burn bar is a cylindrical tube containing the resistor pad, and wherein the resistor pad overlies an external portion of the tube.

4. The deployment system of claim 2, wherein the fusible line is secured under a tensile force against the resistor pad.

5. The deployment system of claim 1, wherein the fusible line is a monofilament.

6. The deployment system of claim 1, wherein a direct contact of the fusible line may be assured by maintaining the line under tension.

7. The deployment system of claim 2, wherein the burn bar is a solid cylinder.

8. A burn bar adapted to melt a fusible line to cause deployment of an apparatus secured to a small satellite, the burn bar comprising:
   a reusable resistive element having a substrate body secured to the satellite;
   an insulative material deposited on an outer surface of the substrate body;
   a layer of electroconductive material deposited over an external portion of the insulative material;
   wherein the layer of electroconductive material is a resistor pad; and wherein the fusible line comprises a monofilament secured directly against the resistor pad, such that when the monofilament is electrically heated to its melting point an apparatus secured to the monofilament is released.

9. The burn bar of claim 8, wherein the monofilament is secured under tension against the resistor pad.

10. The burn bar of claim 9, wherein the monofilament is under a tensile force of between 10 and 15 pounds.

11. The burn bar of claim 8, wherein the substrate body comprises a cylindrical tube, and wherein the resistor pad overlies an external portion of the tube.

12. The burn bar of claim 8, wherein the monofilament is formed of nylon.

13. The burn bar of claim 8, further comprising a tubular body.

14. The burn bar of claim 8, further comprising solid Chevron shaped body.

15. A method of deploying an apparatus secured by a fusible line to a nanosat, the method comprising the steps of:
   providing a resistive element having a substrate body, and securing the substrate body to the nanosat;
   depositing an insulative material on a peripheral surface of the substrate body;
   depositing a layer of electroconductive material over portions of the insulative material to form a resistor pad;
   providing an electrical source within the nanosat, and connecting the resistor pad to the electrical source; and
   causing the electrical source to heat the fusible line to its melting point to release the apparatus.

16. The method of claim 15, further comprising stringing a fusible line directly over the resistor pad, and securing the fusible line to the nanosat.

17. The method of claim 16, further comprising attaching the fusible line to the apparatus to be released.

18. The method of claim 16, further comprising applying tension to the fusible line to assure direct contact between the fusible line and the electroconductive material until time of apparatus release.

19. The method of claim 16, further comprising providing an electrical current from the electrical source through the fusible line sufficient to heat the fusible line to its melting point to release the apparatus.

20. The method of claim 19, further comprising laser etching the electroconductive material to form the resistor pad.

* * * * *